Sept. 15, 1936.  J. L. FINCH  2,054,617
TEMPERATURE CONTROL DEVICE
Filed Jan. 10, 1933
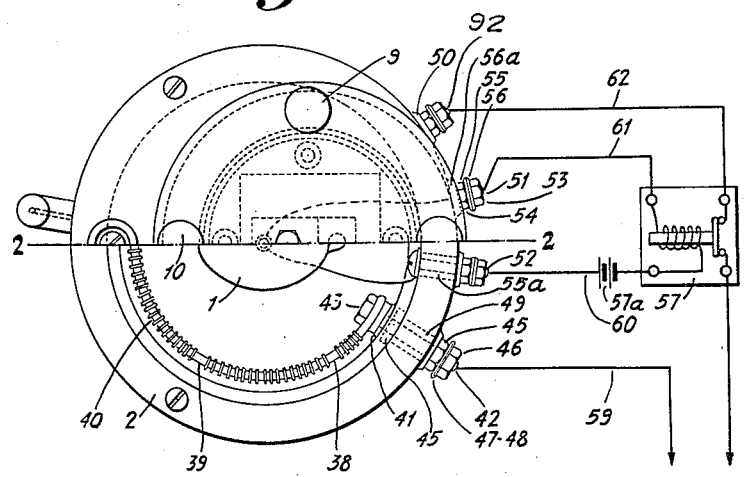
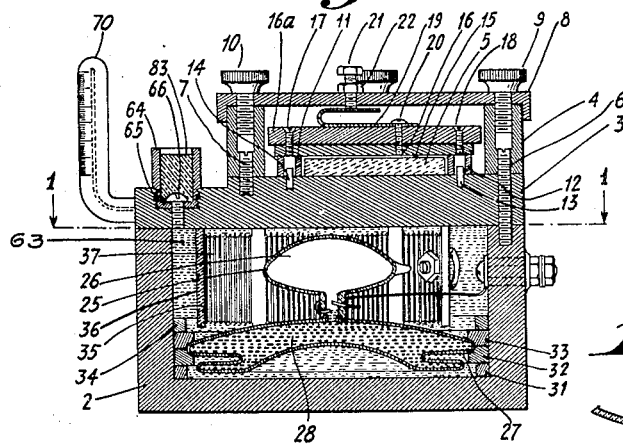
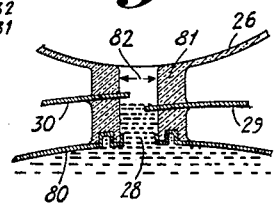
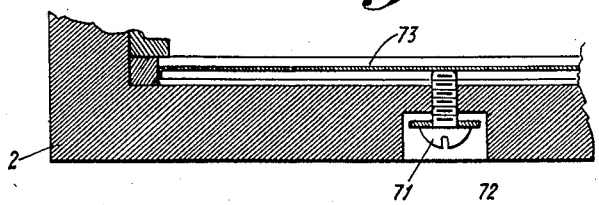
INVENTOR-
J. L. FINCH
BY H. S. Grover
ATTORNEY- Patented Sept. 15, 1936

2,054,617

UNITED STATES PATENT OFFICE 2,054,617

TEMPERATURE CONTROL DEVICE

James Leslie Finch, Patchogue, N. Y., assignor to Radio Corporation of America, a corporation of Delaware Application January 10, 1933, Serial No. 650,987

11 Claims. (Cl. 219—19)

This invention relates to the art of controlling the temperature of a device, and more particularly to the control of the temperature of a piezoelectric crystal as used in connection with an oscillator of radio telephone or telegraph transmitters, or in combination with frequency multipliers, amplifiers, and receivers, each in combination with all types of antennæ and remote or local control devices known to the art, also in combination with frequency modulators and measuring devices.

An object of this invention is to simplify and improve all temperature controlled devices generally.

An object of this invention is to provide a temperature control device for a piezo-electric crystal holder which is rugged and compact.

Another object of this invention is to provide a temperature regulated crystal holder which can be completely assembled and adjusted for the temperature to be held by it at the place of manufacture.

This invention is an improvement over an application of L. L. Young and J. L. Finch, filed October 15, 1931, Ser. No. 568,962, and while the device shown therein maintains satisfactory results in temperature control, such control devices are of relatively fragile parts and require the use of external protective means. It is one of the objects and purposes of this invention to eliminate such objection. Furthermore, in the prior art the specific form of such temperature control devices were such that they could not be relied upon to accurately hold constant temperature due to the fact that a part of the liquid which formed one element of the thermostatic device was exposed to the ambient temperature. The present invention eliminates this defect by having all of the controlling liquid in substantially intimate contact with the crystal holder.

Another feature of this invention is that the use of difficult seals within the chamber containing the liquid, as required by former types of temperature controlling devices, is now no longer necessary. Furthermore, the temperature may be reduced or increased from the operating temperatures by a large margin without causing any material change in the calibration of the controlling thermostatic element.

Another feature of this invention is that the temperature is controlled by a relatively small quantity of mercury contained within a heavy sealed chamber of relatively thick metal.

A better understanding of this invention will be had by reference to the drawing in which reference characters refer to similar parts throughout the several views in which, Fig. 1 is a plan view of the temperature control device, one-half being shown in section to more clearly indicate the interior of the temperature control device. There are also indicated suitable terminals arranged with a relay circuit to more clearly illustrate the electrical temperature controlling connections;

Fig. 2 is a vertical cross-section of the improved temperature control device, the section being taken on lines 2, 2 of Fig. 1;

Fig. 3 is a fragmentary cross-section of the lower portion of Fig. 2 showing a modification of an adjusting means for varying the setting of the temperature control device, and Fig. 4 is an enlarged fragmentary portion of a pressure operated switch of the thermostatic control element as shown in Fig. 2.

Referring now to Fig. 1, the thermostatic element 1 is contained within a metallic housing 2 and is enclosed by a suitable cover 3 of relatively heavy metal, for the purpose of maintaining substantially constant temperature and will not be subjected to slight fluctuations of temperature changes. On this cover 3 is located a smaller metallic ring-like wall forming a closing chamber 4 which houses the piezo-electric crystal 5. The housing 4 is assembled with and fastened to the lower temperature control chamber 2 by suitable screws 6 and is also fastened to the cover 3 by screws 7. A suitable cover 8 is provided and is retained in place by thumb screws 9 and 10. Spacing collars 11 and 12 are guided in position by pins 13 and 14. The length of the collars 13 and 14 are made slightly greater than the thickness of the piezo-electric crystal 5 so as to provide an accurately controlled air gap or space 15 between the upper circular electrode 16 and the lower electrode 3. Lower electrode 3 also acts as a cover for the temperature control device. Suitable connections, not shown, are taken from any convenient location on the upper and lower electrodes. The upper electrode 16 is secured to a connection plate 16a and is retained in place by suitable screws 17 and 18. A spring strip 19 is fastened to the upper plate 16 by a screw 20. The compression of the spring strip 19 is adjusted by means of a bolt 21 which is locked in position by a nut 22. Within the chamber 2 there is placed the pressure operated switch 25 which is in the form of two chambers. The upper chamber 26 being of a suitable volume and shape, such as sphere-shape or ellipsoid-shape, this upper chamber 26 is filled with a suitable quantity of inert gas such as helium, nitrogen or argon, the lower chamber 27 is made of flexible material and is so shaped that its volume will change appreciably when the relative inside and outside pressure is varied. A suitable amount of mercury or other conducting liquid 28 is placed within the lower chamber 27 to a level which will make contact with the lower electrode 29 at the normal ambient temperature. Spaced directly above electrode 29 is a second electrode 30 which will complete an electrical circuit when a rise in temperature causes expansion of the liquids 63 and 28. The lower chamber 27 is spaced above the bottom portion of chamber 1 by a ring 31 and is held central within the chamber by felt washers 32 and 33. A second upper ring 34 is provided to retain felt washers 32 and 33 in place. Surrounding the upper chamber 26 there is provided an electrical heating unit 35 which comprises an insulated form 36 of fibre or other suitable insulating material, and is wound with resistance wire 37. The wire is prevented from short circuiting to the metallic cover 3 by projections 38, 39, 40 and 41 in the insulated winding form, which are located at suitable intervals. An electrical connection is made from each end of the resistance wire by means of terminal screws 42 and 92 which are retained in place by suitable nuts 43, 44, 45 and 46, also washers 47 and 48. The terminal screws are insulated by means of suitable insulating bushings 49 and 50. The electrodes 29 and 30 are connected to another pair of insulated terminal screws 51 and 52 which are provided with suitable nuts 53 and 54, washers 55 and 56. Terminal screws 51 and 52 are insulated from the metallic casing by bushings 55a and 56a. A suitable relay 57 or any other suitable device, together with a battery 57a, is arranged so as to connect the current supply source, the heating element 35 and the relay contacts in series by means of leads 59, 60, 61 and 62. When the level of the mercury rises to a sufficient height, the relay circuit is completed by shorting the electric contacts or electrodes 29, 30.

The remaining space inside the housing 2 is filled with a non-compressible fluid 63, which is a non-conductor electrically but a good conductor thermally, such as oil, etc., and for the purpose of filling, a funnel 64 is provided which is fastened to the cover 3 at 65. After the housing has been filled to the proper level the chamber is sealed by a screw 66. A suitable thermometer 70 is inserted in a hole in the block 3 for reading the temperature of the device.

Referring now to Fig. 3, another modification which comprises a means for accurately adjusting the temperature range is shown wherein there is provided an adjusting screw 71, a spring washer 72 and a movable diaphragm 73, which parts are arranged to change the volume of the fluid 63 within the chamber 2 by means of raising or lowering the level of the diaphragm 73.

The detailed showing in Fig. 4 of the pressure operated switch portion of the thermostatic control element shows the manner in which the metallic walls 80 are retained and fastened to the thickened neck portion 81 of the upper chamber 26. This shows that the portion 81 contains a suitable aperture 82 for retaining the electrodes 29 and 30. The operation of this device is as follows: At all temperatures below a certain value, the mercury 28 will not rise in the aperture 82 high enough to close the relay circuit between the electrodes 29 and 30. When this circuit is open the relay 57 is closed and the heating current is allowed to pass through the heater winding 36. Current passing through this winding supplies heat which will raise the temperature of the entire unit. The non-conducting liquid 63 will expand more rapidly than the thick walls of the housing 2 with increase in temperature, and this in turn will collapse the chamber 27 to some extent, which will force the mercury level up into the necked portion 82, and at a particular predetermined temperature at which the device has been set the circuit between electrodes 29 and 30 will be closed. When this circuit is closed, the relay 57 opens the heating circuit and thereby cuts off the current supplying the heat to the resistor 36. Now, as the block 2 and its contents cool, the non-conducting liquid 63 will shrink faster than the metallic housing 2. The mercury level in the necked portion 82 will then fall and again opening the circuit between electrodes 29 and 30. The cycle will then be repeated. Thus, the temperature will be maintained at a value just sufficient to close the circuit between electrodes 29 and 30. When desired, the relay 57 may be dispensed with and the heating element short circuited when the proper temperature is obtained by connecting a lead not shown, from screw 51 to 92, also providing another lead from screw 52 to 42. The heater supply current will then connect through a suitable current limiting resistor to terminal screws 42 and 92.

To adjust the temperature which is to be maintained, it is only necessary to put in or take out some of the non-conducting liquid 63 as is required. To do this, the screw 66 is loosened and the funnel 64 is filled with the non-conducting liquid, the temperature of the housing 2 being then set at the desired temperature. If the new temperature is to be of a value lower than before, liquid will be drawn in, whereas if the temperature is to be of a higher value, liquid will be forced out. When the desired temperature to be maintained is obtained, the seal screw 66 is again tightened and the remaining space within the funnel 64 may be filled with sealing wax or other suitable sealing material 83. When this improved temperature control unit is set for operation at a given temperature, and if for any reason its temperature rises above the value set, mercury will be forced through the neck 82 into the upper chamber 26, thus causing the gas to be compressed. The relative size of chamber 26 compared to the remainder of the unit must be such that for a reasonable change of temperature the gas pressure will not become excessive. Also, the flexibility of the lower chamber 26 must be such that it can collapse a corresponding amount without breaking. If the unit is in operation at a given temperature, and should the device cool off for any reason, gas will be drawn off from chamber 26 down through 82 into chamber 27, and allowing chamber 27 to expand and make up for the decreased volume of the liquid relative to the block. Sufficient clearance must be allowed for the movement of chamber 27 so that it will not be damaged by contact with other parts nor interfered with in its motion at the normal operating temperature.

While this invention discloses a general form and arrangement of temperature control devices, it is to be clearly understood that it is not to be limited but is capable of being used in other embodiments and modifications within the spirit and scope thereof.

I claim:

1. A temperature controlling device comprising a metallic container having external seal containing a liquid which is electrically a non-conductor and a good conductor of heat, said liquid surrounding a pair of chambers, the level of one of said chambers being higher than the other, each of said chambers being connected by a neck of insulating material of relatively small cross-sectional area, said neck having electrical contacts sealed therein, said lower chamber being shaped of relatively thin material so as to be readily expandable or collapsible and filled with mercury, and said upper chamber being rigid and filled with an inert gas.

2. A temperature controlling device comprising a metallic container having an external seal containing a liquid which is electrically a non-conductor and a good conductor of heat, said liquid surrounding a pair of chambers, the level of one of said chambers being higher than the other, each of said chambers being connected by a neck of insulating material of relatively small cross-sectional area, said neck having electrical contacts sealed therein, said lower chamber being shaped of relatively thin material so as to be readily expandible or collapsible and filled with mercury, said upper chamber being rigid and filled with an inert gas, and a heater element immersed in said liquid for maintaining a pre-determined temperature.

3. A temperaure controlling device comprising a metallic container having an external seal containing a liquid which is electrically a non-conductor and a good conductor of heat, said liquid surrounding a pair of chambers, the level of one of said chambers being higher than the other, each of said chambers being connected by a neck of insulating material of relatively small cross-sectional area, said neck having electrical contacts sealed therein, said lower chamber being shaped of relatively thin material so as to be readily expandable or collapsible and filled with mercury, said upper chamber being rigid and filled with an inert gas, a heater element immersed in said liquid for maintaining a predetermined temperature, and means for changing the volume of said liquid to control said predetermined temperature.

4. A temperature controlling device comprising a metallic container having an external seal containing a liquid which is electrically a non-conductor and a good conductor of heat, said liquid surrounding a pair of chambers, the level of one of said chambers being higher than the other, each of said chambers being connected by a neck of insulating material of relatively small cross-sectional area, said neck having electrical contacts sealed therein, said lower chamber being shaped of relatively thin material so as to be readily expandable or collapsible and filled with mercury, said upper chamber being rigid and filled with an inert gas, a heater element immersed in said liquid for maintaining a predetermined temperature, and means for slightly altering the volume of said liquid while said device is in operation.

5. A temperature controlling unit having in combination a piezo-electric crystal holder comprising a metallic housing in thermal contact with said holder, an electric heating unit having temperature controlling means located within said housing and arranged directly below said crystal holder, said temperature controlling means comprising two chambers, one of said chambers containing a gas, the other chamber containing an electrical conducting liquid, fluid communication means between each of said chambers, electrical contacts located within the zone of said fluid communicating means, the quantity of said conducting liquid being sufficient to short circuit said contacts upon a rise of temperature within said housing thereby closing an electrical circuit for controlling said electric heating unit and an electrically non-conducting liquid within said housing entirely surrounding said temperature controlling means and said heating unit.

6. A temperature controlling unit comprising a metallic casing having an external seal, a liquid within said casing which is electrically a non-conductor and a good conductor of heat, a temperature control switch located within said casing, a resistance wire heating unit surrounding said temperature control switch, said temperature control switch having an upper chamber containing a gas and a flexible lower chamber containing an electrically conducting liquid, a relatively narrow connecting neck interposed between the upper chamber and the lower chamber, a pair of contact members located within said neck and arranged to operate a relay by means of a moveemnt of said electrically conducting liquid short-circuiting said contacts when the temperature changes the volume of the electrically non-conducting liquid.

7. A temperature controlling device comprising a metallic container having an external seal, a liquid within said casing which is electrically a non-conductor and a good conductor of heat, external temperature indicating means for determining the temperature of said metallic container, electric heating means for maintaining a predetermined temperature on the electrode of a piezo-electric crystal, said electric heating means comprising a wire resistance heating unit located within said metallic container, temperature regulating means comprising a control device having an ellipsoid upper chamber containing an inert gas, a flexible lower chamber containing an electrically conducting liquid, a relatively narrow neck interposed between the upper chamber and said lower chamber, a pair of contacts located within said neck and arranged to operate a relay which is connected in series with said electric heating means and an electrical supply source by means of a movement of said electrical conducting liquid shorting said contacts when the temperature changes the volume of the electrically non-conducting liquid.

8. A temperature regulator for controlling the temperature of an oscillator, said regulator comprising a metallic container having an external seal, a non-conducting liquid and electrical heating unit surrounding a thermostatic device having two separate chambers, one of said chambers being ellipsoid shaped and containing an inert gas, the other chamber containing an electrically conducting liquid, communicating means between said chambers, said communicating means having electrical contact elements cooperating with said electrically conducting liquid for controlling an external electrical circuit and a diaphragm for externally adjusting means located in said container, said external adjusting means arranged in the wall of said container for externally displacing said non-conducting liquid to adjust the temperature to be controlled by said regulating means.

9. A temperature controlling device, comprising a metallic container having relatively thick walls, a seal for said container, a liquid which is electrically a non-conductor and a good conductor of heat located within said container, said non-conducting liquid surrounding a pair of chambers, the level of one of said chambers being higher than the other, fluid communicating means between each of said chambers, electrical contacts located within the zone of said fluid communicating means, said upper chamber being substantially ellipsoid in shape and filled with an inert gas, said lower chamber having relatively thin walls so as to be readily expandible or collapsible on change of pressure within said container, a conducting fluid within and substantially filling said lower chamber whereby a temperature rise within said metallic container causes the conducting fluid to rise and short circuit said contacts thereby completing an electrical circuit, a heating element immersed in said non-conducting liquid and located within the inside walls of said container, a source of current connected in series with said heating element and said electrical circuit for maitnaining a predetermined temperature.

10. A temperature controlling device, comprising a metallic container having relatively thick walls, a seal for said container, a liquid which is electrically a non-conductor and a good conductor of heat located within said container, said non-conducting liquid surrounding a pair of chambers, the level of one of said chambers being higher than the other, fluid communicating means between each of said chambers, electrical contacts located within the zone of said fluid communicating means, said upper chamber being substantially ellipsoid in shape and filled with an inert gas, said lower chamber having relatively thin walls so as to be readily expandible or collapsible on a change of pressure within said container, a conducting fluid within and substantially filling said lower chamber whereby a rise of temperature within said metallic container causes the conducting liquid to rise and short circuit said contacts thereby completing an electrical circuit, a heating element immersed in said non-conducting liquid and located substantially concentric with the inside walls of said container, a source of current connected in series with said heating element and said electrical circuit for maintaining a predetermined temperature.

11. A temperature controlling device, comprising a metallic container having relatively thick walls, a seal for said container, a liquid which is electrically a non-conductor and a good conductor of heat located within said container, said non-conducting liquid surrounding a pair of chambers, the level of one of said chambers being higher than the other, fluid communicating means between each of said chambers, electrical contacts located within the zone of said fluid communicating means, said upper chamber being substantially ellipsoid in shape and filled with an inert gas, said lower chamber having relatively thin walls so as to be readily expandible or collapsible upon a change of pressure within said chamber, a conducting fluid within and substantially filling said lower chamber whereby a rise of temperature within said container causes the conducting fluid to rise and short circuit said electrical contacts thereby closing an electrical relay circuit, a heating element immersed in said non-conducting liquid and located substantially concentric with the inside walls of said container, a source of current connected in series with said heating element and said relay circuit for maintaining a predetermined temperature, and adjustable means for externally changing the volume of said metallic container which is occupied by said non-conducting liquid.

JAMES LESLIE FINCH.